April 24, 1973  D. G. SHORE ET AL  3,729,367
RUBBER PRODUCT FOR TIRE RECAPPING APPARATUS
AND METHOD FOR MAKING
Filed June 1, 1971
FIG_1
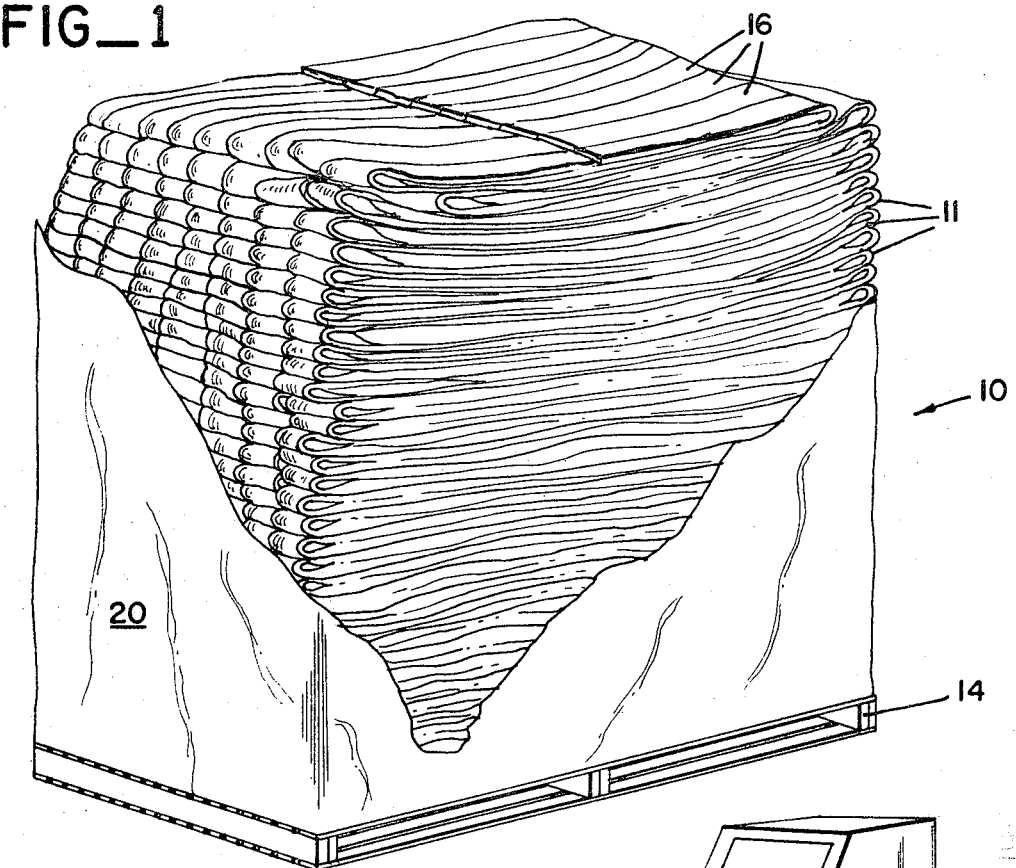
FIG_2
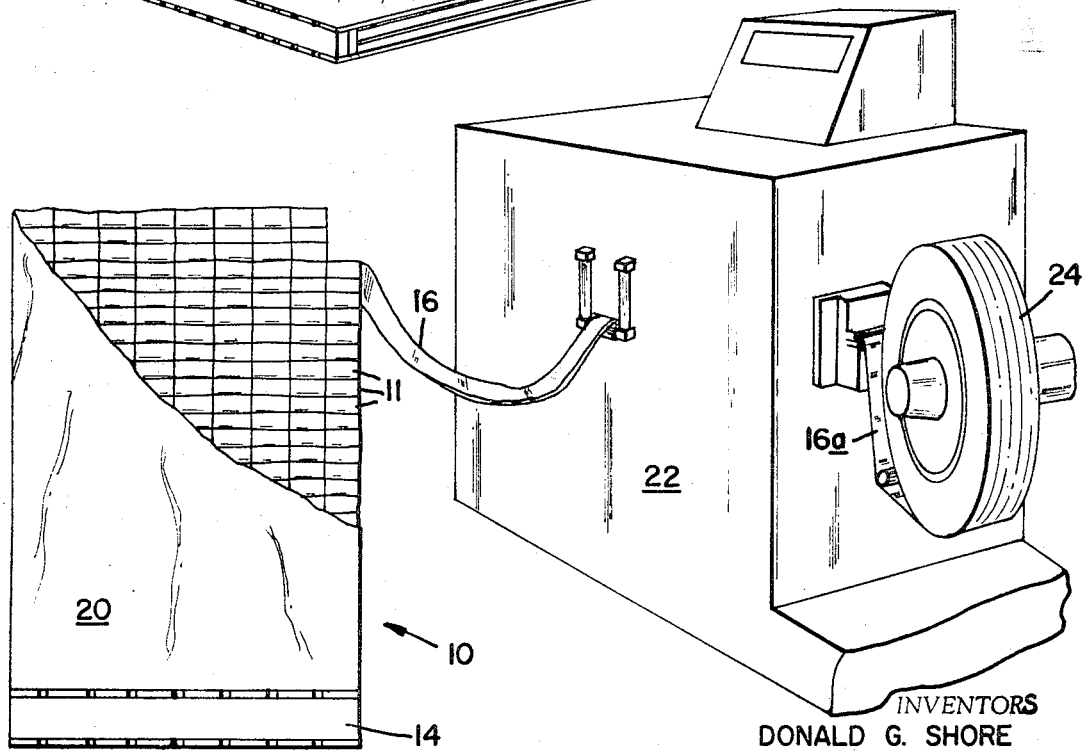
INVENTORS
DONALD G. SHORE
BY VITALIJS TURJANIS
Owen, Wickersham & Erickson
ATTORNEYS

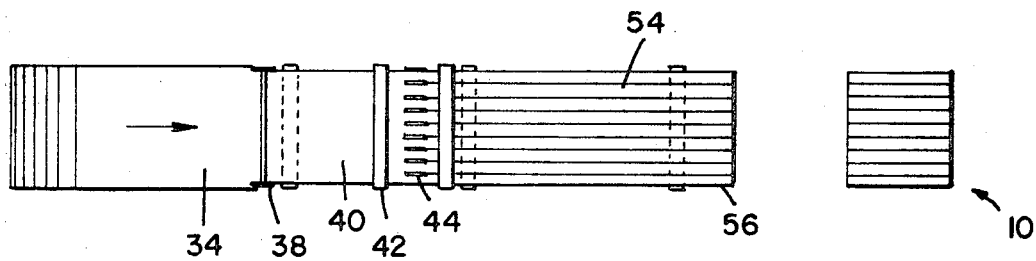
FIG_3
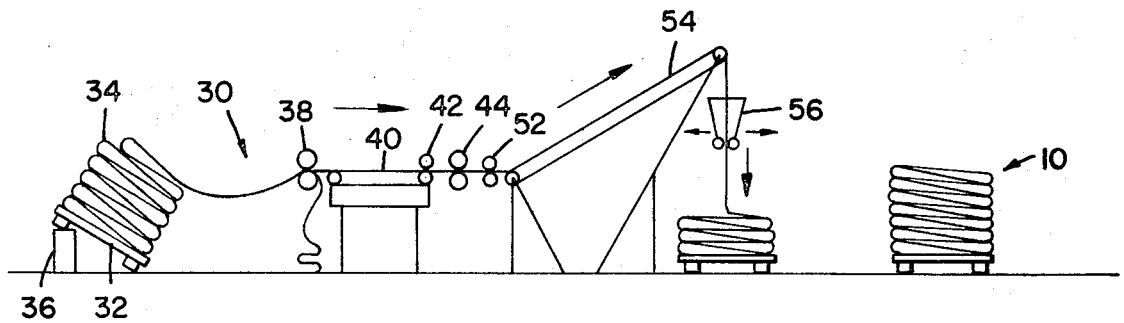
FIG_4
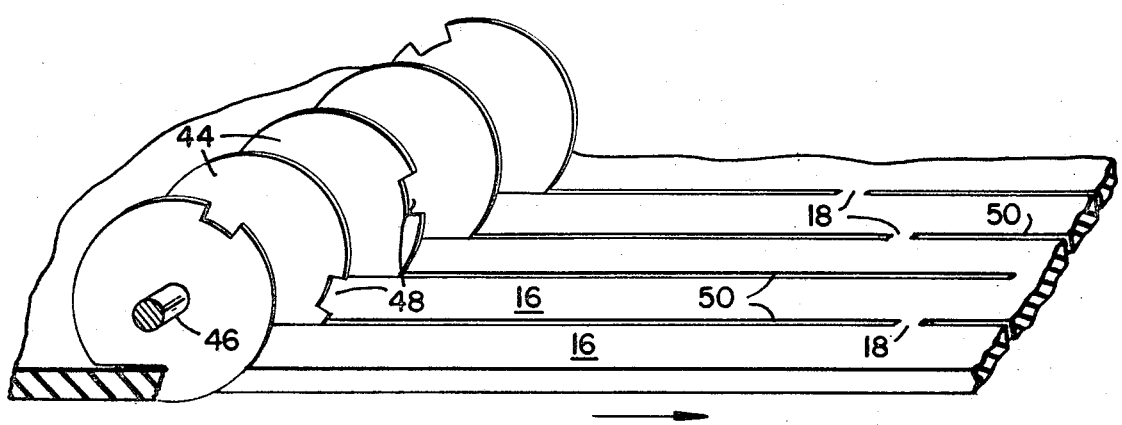
FIG_5
FIG_6

United States Patent Office 3,729,367
Patented Apr. 24, 1973

3,729,367
RUBBER PRODUCT FOR TIRE RECAPPING APPARATUS AND METHOD FOR MAKING
Donald G. Shore, Walnut Creek, and Vitalijs Turjanis, Berkeley, Calif., assignors to Oliver Tire & Rubber Company, Oakland, Calif.
Filed June 1, 1971, Ser. No. 148,819
Int. Cl. B65d 75/00; B65b 53/02
U.S. Cl. 161—102
5 Claims

ABSTRACT OF THE DISCLOSURE

A rubber product for use in a wrap-on type of tire recapping machine comprising an elongated rubber slab of substantially equal width and thickness and partially severed along longitudinal lines that are equally spaced apart to form adjacent strips, with intermittent breakable web portions interconnecting adjacent strips. The slab, with strips connected, is stacked in a series of folds of equal length and surrounded by a cover that provides support as the product is used when the outermost strip is pulled away by a tension that breaks the web portions. The invention also includes a method for making the product that includes the steps of severing the slab to form intermittent longitudinal slits and web portions and stacking the slab in a series of folds.

---

This invention relates to a tread rubber product particularly adaptable for use in recapping tires and it also relates to a method and apparatus for making the product.

One widely used method for recapping tires is to feed a narrow ribbon of green recapping rubber into a machine which extrudes the rubber into a ribbon of closer tolerances. The tire casing being recapped is held by a movable fixture adjacent the machine and is rotated while being moved back and forth so that the extruded ribbon of recapping rubber is wound onto the tire in a precise predetermined manner. In another type of recapping machine a wider strip of rubber is used to make one complete wrap around the tire casing. Such wider strips are formed from extruder machines that utilize an elongated ribbon of raw rubber to produce lengths of the single wrap recapping rubber sections with a precise cross-section. Prior to the present invention the narrow green rubber material for the aforesaid machines was produced as a single long ribbon which was piled loosely in bins for shipment and storage. In use, the elongated strip of material was merely withdrawn from the storage bin by the feeding force of the machine. Several disadvantages were inherent with this handling method for ribbon-type tread rubber. For one thing the loops of the narrow rubber ribbon often became tangled in the storage bin, and this required extra manpower to disentangle them and help feed the recapping machine as the rubber was being withdrawn from the bin. Also, the amount of rubber that could be stored in a bin per unit of space was variable and relatively low, increasing freight and storage costs.

It is therefore a general object of the present invention to provide a green rubber ribbon or strip-like product that solves the above problems and more particularly one that is easy to handle in feeding a winding type recapping machine.

Another object of the present invention is to provide a strip-type rubber product for tire recapping that requires less space per unit of weight in storage and shipment than similar products heretofore required.

Yet another object of the present invention is to provide a method and apparatus for producing a ribbon or strip-type rubber product having the aforesaid advantages and features.

Still another object of our invention is to provide an apparatus for making a strip-type rubber product that is easy to operate at a high production rate and yet is relatively inexpensive to construct and maintain.

In general, the rubber product according to my invention comprises a stack of a multiplicity of compressed, undulated, horizontal folds of a relatively wide, elongated green rubber strip. This wide strip has been slit at parallel intervals along its length to form a plurality of ribbon sections of equal width. These slits are discontinued at regular intervals by integral web portions so that the ribbon sections are held together. Thus, when made, the product may be shipped and stored as a compact rubber stack when secured in its own packaging. In use, it is placed near the inlet of a ribbon type recapping machine. When a free end of the outermost ribbon section is fed into the machine, it is pulled from the total package and the web portions easily break as tension is applied by the machine. The package can be left relatively unattended because the problem of entanglements has been eliminated. When each ribbon section has been completely pulled from the package, it is a simple procedure to start the next one on the outermost side of the package.

Other objects, advantages and features of our invention will become apparent from the following detailed description taken in conjunction with the drawings, in which:

FIG. 1 is a view in perspective of a rubber product according to our invention with a portion of its packaging cover broken away;

FIG. 2 is a view in perspective showing the rubber of FIG. 1 as it appears when used to supply a tire recapping machine;

FIG. 3 is a schematic plan of an apparatus for making the product of FIG. 1;

FIG. 4 is a view in elevation of the apparatus of FIG. 3;

FIG. 5 is an enlarged fragmentary view in perspective showing a portion of the apparatus of FIGS. 3 and 4; and FIG. 6 is an enlarged cross-section of the rubber strip comprising our product shown as it leaves the apparatus.

Referring to the drawing, FIG. 1 shows a package of tread rubber 10 embodying the principles of our invention as it appears when formed and ready for use. Generally, it comprises an elongated slab of flexible, unvulcanized or "green" rubber compound having a uniform width and arranged in compressed, wave-like or folded layers 11 to form a vertical stack, preferably mounted on a skid or pallet 14. Along its entire length, the rubber slab is slit at intervals to form a series of ribbons or strips 16 of equal width. These strips are joined together by web portions 18 spaced apart at intervals (e.g. 16–20 inches) along their length. The webs interconnecting all of the strips 16 of the slab are spaced apart essentially the same amount but the webs of adjacent ribbons or strips are offset transversely so that they are not in alignment along any line perpendicular to the longitudinal axis of the slab. Thus, the tread rubber package 10 is a unitary product which may be produced by a rubber manufacturer for sale to and use by tire recappers. Normally, a desired number and length of layers 11 of the rubber slab are provided on the pallet 14 whose overall dimensions and a total weight are compatible with optimum freight handling considerations. Around the package 10 and in combination with the compress folds or layers 11 of rubber is a flexible thin plastic bag 20 that protects it during shipment and handling and also stabilizes it during its later use.

When the rubber product 10 is used in a tire recapping machine 22 as shown in FIG. 2, the free end of the outermost strip or ribbon 16 of rubber is withdrawn from the package after a part of the bag 20 has been removed from that side. This free end is inserted into the recapping machine 22 which draws the rubber ribbon into it at a constant rate and keeps a continuous tension on it. Within the machine the rubber is heated and then extruded through an outlet to a ribbon 16a whose cross-sectional dimensions are held to fairly close tolerances. This latter ribbon of recapping rubber is then applied to a tire casing 24 which is rotated while being moved horizontally back and forth so that the recapping rubber is spirally wound in a precise manner on the tire.

As the machine pulls on the rubber strip from the package 10 the web portion 18 holds it in place until just before it is broken by the tension applied to the strip. The remaining strips or ribbons of the rubber slab remain in place within the package and are held in place by the plastic cover 20. After the first outermost strip has been consumed by the machine, the next strip is inserted into it and removed from the package in the same manner.

FIGS. 3–5 are presented to illustrate an apparatus 30 and a method particularly adaptable for making the slab rubber product 10 of FIGS. 1 and 2. This apparatus comprises a pallet or skid 32 which supports a rough elongated slab 34 of "green" tread rubber that was previously stacked on the pallet as received from a conventional batch mixer and extruder of the type commonly used for processing such rubber materials. The pallet 32 is preferably supported at an angle on a block 36. The rough slab 34 first extends through a pair of spaced apart edge rotary trimming knives 38 that remove any ragged edges from the slab and trim it to a constant width. Thereafter, the slab 34 is drawn by a conveyor 40 through a pinch-roller 42 and thence toward a series of rotary slitting and web-forming knives 44. As shown in FIG. 5, these knives are disc shaped and spaced apart at evenly spaced internals on a common shaft 46. Each disc knife 38 has a notched out recess 48 on its periphery with a predetermined depth (e.g. ½ inch). Thus, as the rubber material is drawn through the rotary knives, they provide parallel slits 50 that are interrupted at intervals by the webs 18. From the slitting and web-forming knives 38 the slab product is pulled upwardly through another roller 52 by an inclined conveyor 54. At the top of this conveyor the slab product extends downwardly through a combined guide member and wig-way device 56 that is continuously moved back and forth through angular limits as indicated by the arrows in FIG. 4. This latter component serves to feed the slab product directly onto the pallet 14 which forms the base support for the package 10.

After the desired amount of rubber material is placed onto the pallet, it is moved to a package station where the plastic cover 20 is applied. Here, the plastic cover, such as polyethylene in the form of a preformed bag, is placed over the palletized rubber material. The bag is then preferably shrunk and secured to the exposed pallet side surfaces by applying heat as from a portable gas fired heat cannon or some other suitable device. After packaging, the palletized slab rubber product 10 is readily transportable by a forklift vehicle to a finished goods warehouse or shipping location for storage or delivery to the user.

While FIG. 2 illustrates one form of tire recapping machine 22 wherein the rubber ribbon material 16 is extruded and applied directly to a tire, the material may also be utilized with extruded machines that use single wrap recapping sections. The width of the ribbon material may be greater when used in the latter type of machine. Thus, the width of ribbon and application shown in FIG. 2 is merely illustrative and should not be considered limiting.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An article of manufacture adapted for use in recapping tires comprising:
    an elongated slab of rubber of substantially uniform width and thickness, said slab being sub-divided by longitudinally extending, parallel and equally spaced apart slits to form adjacent strips, breakable web means spaced apart at intervals along said slits to hold said strips together; said slab being folded along its length in a series of folds that are substantially equally spaced apart a distance greater than said slab width and are transverse to said slits, thereby forming a vertical stack of slab folds of equal length;
    cover means surrounding said vertical stack; and
    base means under said stack.

2. The article of manufacture according to claim 1 wherein said web means adjoining adjacent strips are offset from any line perpendicular to said longitudinal slits.

3. The article of manufacture according to claim 1 wherein said base member is a loading pallet adaptable for use by a fork-lift loading vehicle and said cover member is attached at its lower end to said pallet.

4. The article of manufacture according to claim 1 wherein said cover member is a thin plastic member stretched tightly over said stack which serves to support it as it is being consumed by a tire recapping apparatus.

5. A method for producing a rubber product adapted for use by a wrap-on type of recapping machine, comprising the steps of:
    forming an elongated slab of "green" rubber having substantially a uniform width and thickness;
    severing said slab along longitudinal lines at parallel, evenly spaced apart intervals to form adjacent strips of equal width while simultaneously forming intermittent web portions at spaced apart locations that interconnect said strips;
    feeding said slab with its strips held together onto a base support member while moving said slab back and forth so as to form an undulating stack of slab folds of equal length;
    covering said stack with a protective sheet of thin plastic material; and
    applying heat to said plastic sheet to shrink it tightly around said stack of folds and to attach it to said base means.

References Cited

UNITED STATES PATENTS

| | | | |
|---|---|---|---|
| 2,581,421 | 1/1952 | Lombard et al. | 161—109 |
| 3,653,382 | 4/1972 | Easley et al. | 161—132 |
| 2,822,086 | 2/1958 | Franks | 206—83.5 X |
| 2,828,799 | 4/1958 | Harrison | 156—84 |
| 2,971,643 | 2/1961 | Farley | 206—83.5 |
| 2,993,820 | 7/1961 | Marshall | 156—56 |
| 3,640,049 | 2/1972 | Fritz et al. | 53—30 |
| 3,641,732 | 2/1972 | Fujio | 53—30 X |
| 3,662,512 | 5/1972 | Zelnick | 53—30 |
| 3,670,880 | 6/1972 | Burleson et al. | 206—65 S |
| 3,695,426 | 10/1972 | Engelsberger | 206—65 S |

HAROLD ANSHER, Primary Examiner

U.S. Cl. X.R.

53—30; 156—85, 204, 227, 257; 161—106, 132; 206—56 AB, 65 S